US006546375B1

(12) United States Patent
Pang et al.

(10) Patent No.: US 6,546,375 B1
(45) Date of Patent: Apr. 8, 2003

(54) APPARATUS AND METHOD OF PRICING FINANCIAL DERIVATIVES

(75) Inventors: Jong-Shi Pang, Timonium, MD (US); Jacqueline Huang, East Hills, NY (US)

(73) Assignee: Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/400,855

(22) Filed: Sep. 21, 1999

(51) Int. Cl.[7] .............................................. G06F 17/60
(52) U.S. Cl. ........................................................ 705/37
(58) Field of Search ............................ 705/35, 36, 37

(56) References Cited

U.S. PATENT DOCUMENTS

| | | | | |
|---|---|---|---|---|
| 5,557,517 A | * | 9/1996 | Daugherty, III | 705/37 |
| 5,692,233 A | | 11/1997 | Garman | 705/36 |
| 5,745,383 A | | 4/1998 | Barber | 705/36 |
| 5,812,988 A | * | 9/1998 | Sandretto | 705/36 |
| 5,819,238 A | | 10/1998 | Fernholz | 705/36 |
| 5,884,286 A | | 3/1999 | Daughtery, III | 705/36 |
| 6,061,662 A | * | 5/2000 | Makivic | 705/36 |
| 6,173,276 B1 | * | 1/2001 | Kant et al. | 706/50 |
| 6,321,212 B1 | * | 11/2001 | Lange | 705/37 |

FOREIGN PATENT DOCUMENTS

| | | | | |
|---|---|---|---|---|
| JP | 2001-67409 A | * | 3/2001 | G06F/17/60 |
| JP | 2001-222620 A | * | 8/2001 | G06F/17/60 |
| WO | WO 97/07475 | * | 2/1997 | G06F/157/00 |

OTHER PUBLICATIONS

Huang, Jacqueline, "American Options and Complementarity Problems", 2000, The Johns Hopkins University.*
Margrabe, Bill, "Equity Basket Swaps and Options: Part II", Dec. 18, 2000, Derivatives Week, vol. 9, No. 51, p. 5.*
Dumas, Bernard et al., "Implied Volatility Functions: Empirical Tests." Dec. 1998, Journal of Finance, vol. 53, No. 6, pp. 2059–2063.*
Tufano, Peter, "The Determinants of Stock Price Exposure: Financial Engineering and the Gold Mining Industry", Jun. 1998 Journal of Finance, vol. 53, No. 3, pp. 1015–1053.*
Focardi, Sergio, "From Equilibrium to Non–linear Dynamics in Investment Management." Summer 1996, Journal of Portfolio Management, vol. 22, No. 4, pp. 19–30.*
Jacqueline Huang and Jong–Shi Pang, "Option Pricing and Linear Complementarity", vol. 2, No. 1, Fall 1988.
Zhi–Quan Luo, Jong–Shi Pang and Daniel Ralph, "Mathematical Programs with Equilibrium Constraints", 1996.

* cited by examiner

Primary Examiner—Robert P. Olszewski
Assistant Examiner—Bryan Jaketic
(74) Attorney, Agent, or Firm—Dickstein Shapiro Morin & Oshinsky LLP

(57) ABSTRACT

An apparatus for and method of determining the price of financial derivatives such as options. One preferred embodiment of the invention employs a discretized partial differential linear complementarity problem (PDLCP) based system to determine the forward pricing of financial instruments such as vanilla American options. In this embodiment, an optimization problem in the form of a mathematical program with equilibrium constraints (MPEC) is implemented to derive implied volatilities of the assets underlying the subject derivatives. The implied volatilities thus derived are used as inputs in the PDLCP-based system to accurately determine the forward pricing of the subject derivatives.

20 Claims, 10 Drawing Sheets

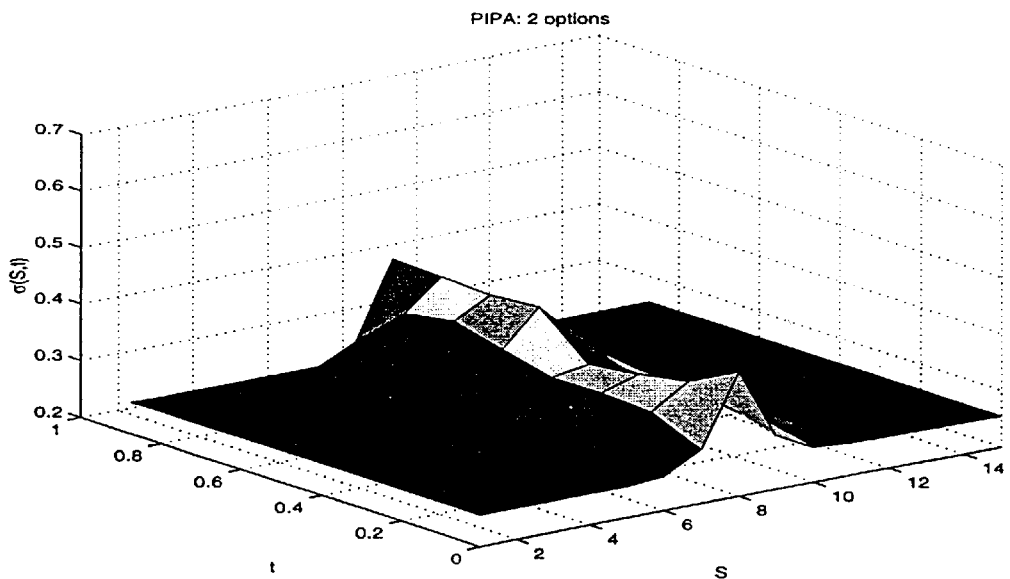
Fig. 5 : Example 1, volatility surface produced by PIPA, 2 observed options
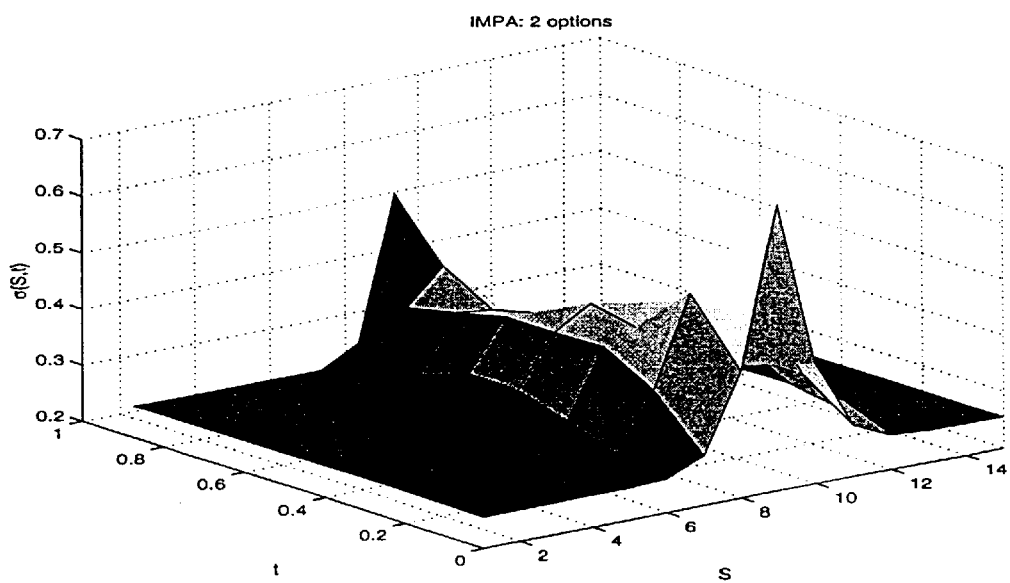
Fig. 6 : Example 1, volatility surface produced by IMPA, 2 observed options

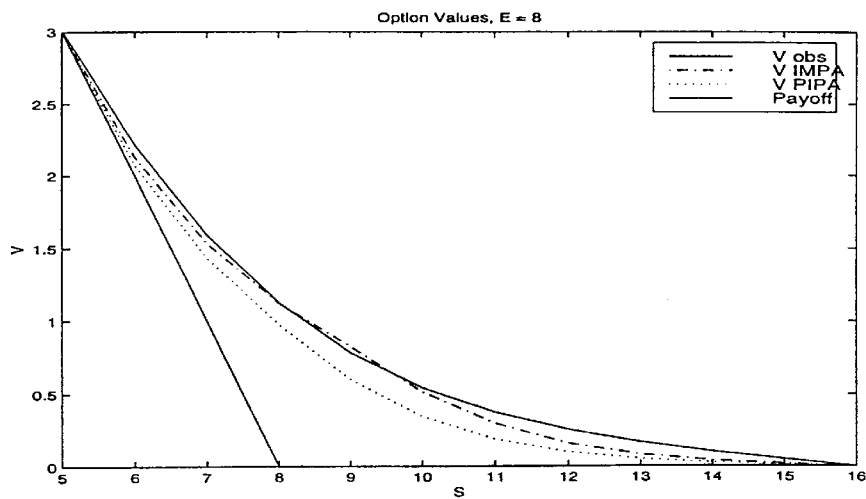
Fig. 7: Example 1, options values calculated using constant/PIPA/IMPA volatility surfaces, E = 8
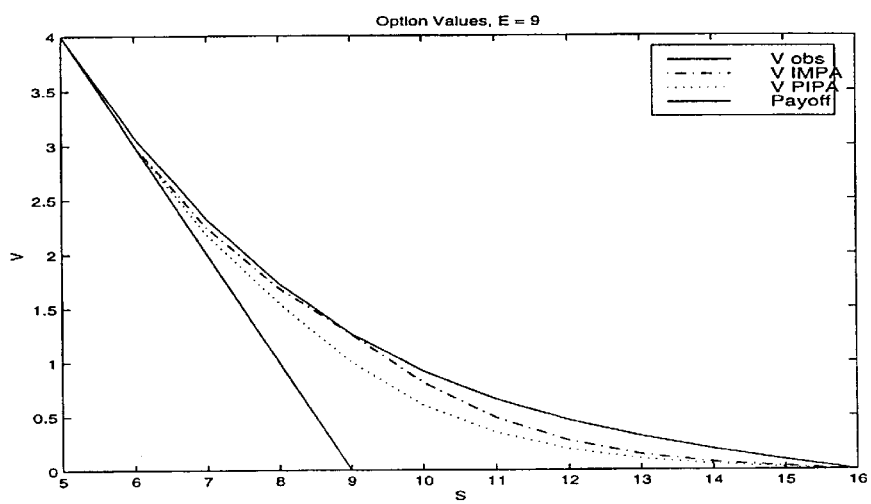
Fig. 8: Example 1, options values calculated using constant/PIPA/IMPA volatility surfaces, E = 9

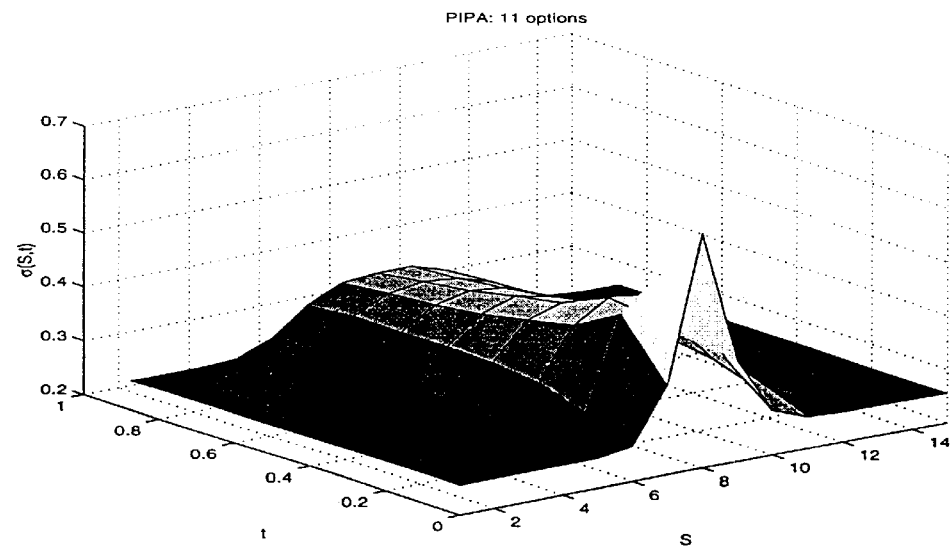
Fig. 9: Example 2, volatility surface produced by PIPA, 11 observed options
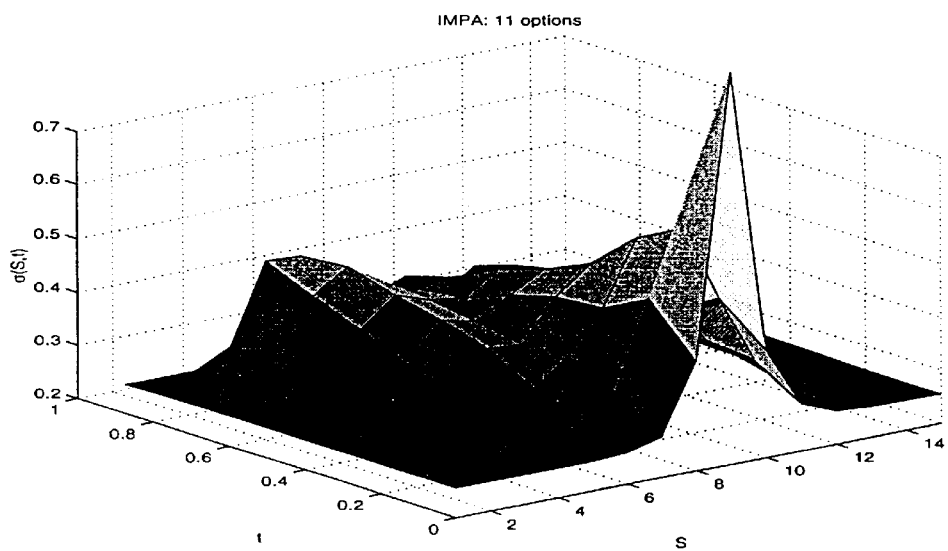
Fig. 10: Example 2, volatility surface produced by IMPA, 11 observed options

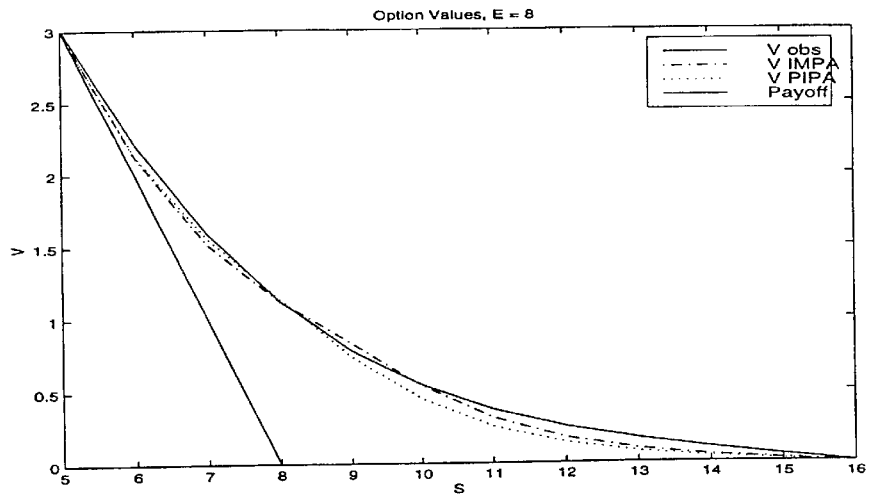
Fig. 11 : Example 2, options values calculated using constant/PIPA/IMPA volatility surfaces, E = 8
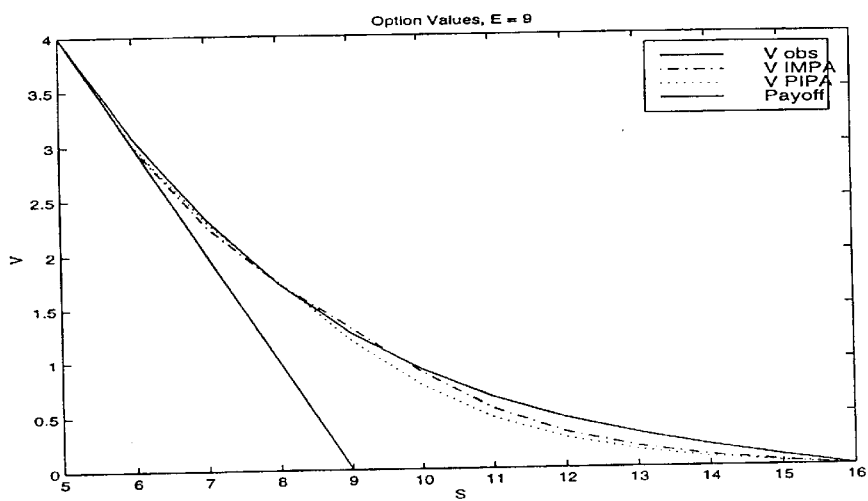
Fig. 12 : Example 2, options values calculated using constant/PIPA/IMPA volatility surfaces, E = 9

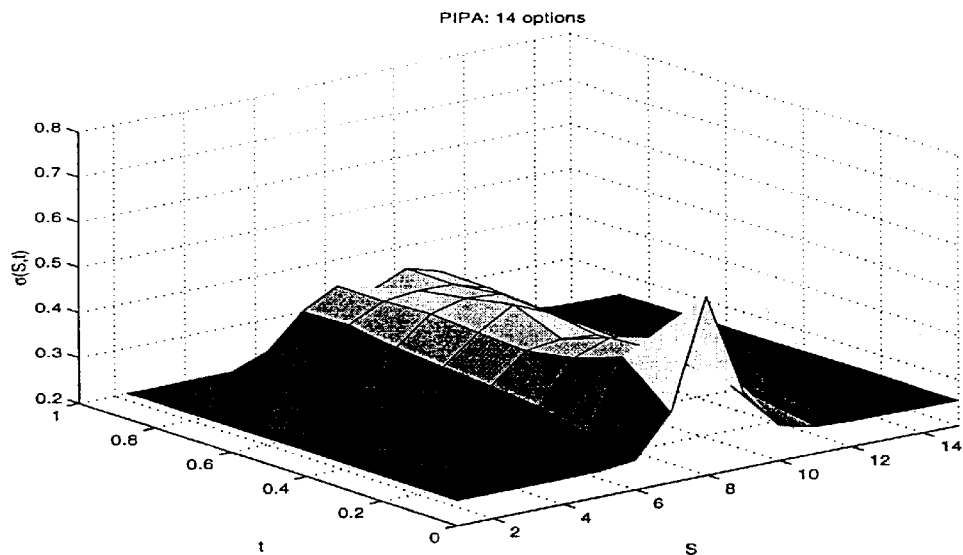
Fig. 13 : Example 3, volatility surface produced by PIPA, 14 observed options
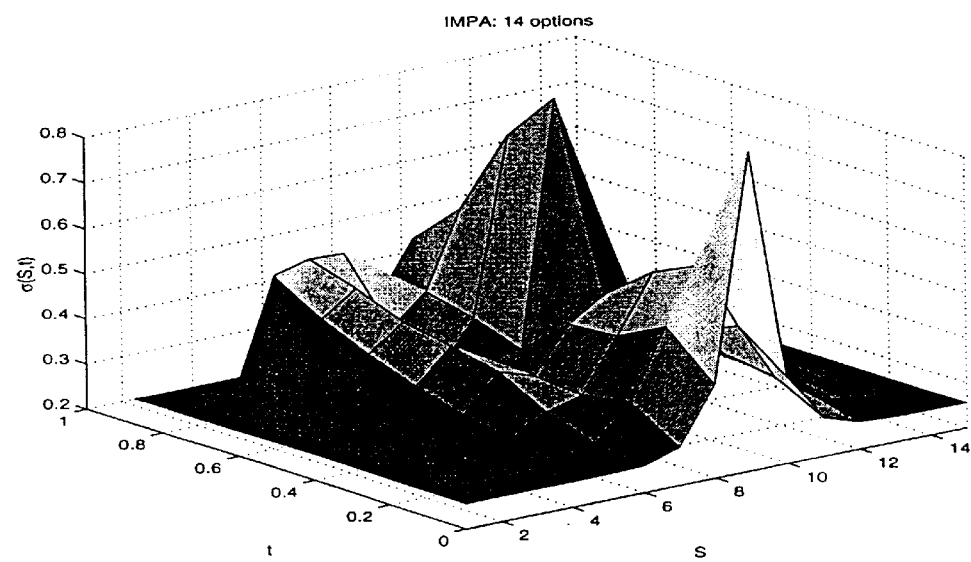
Fig. 14 : Example 3, volatility surface produced by IMPA, 14 observed options

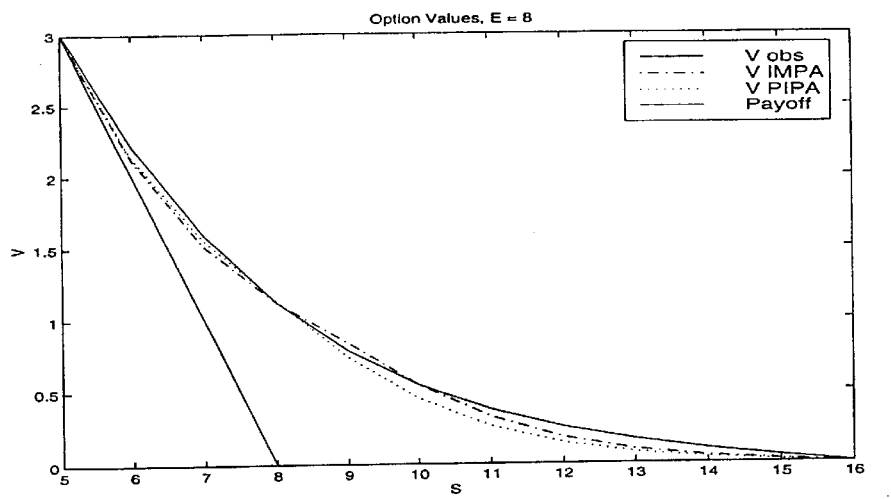
Fig. 15 : Example 3, options values calculated using constant/PIPA/IMPA volatility surfaces, E = 8
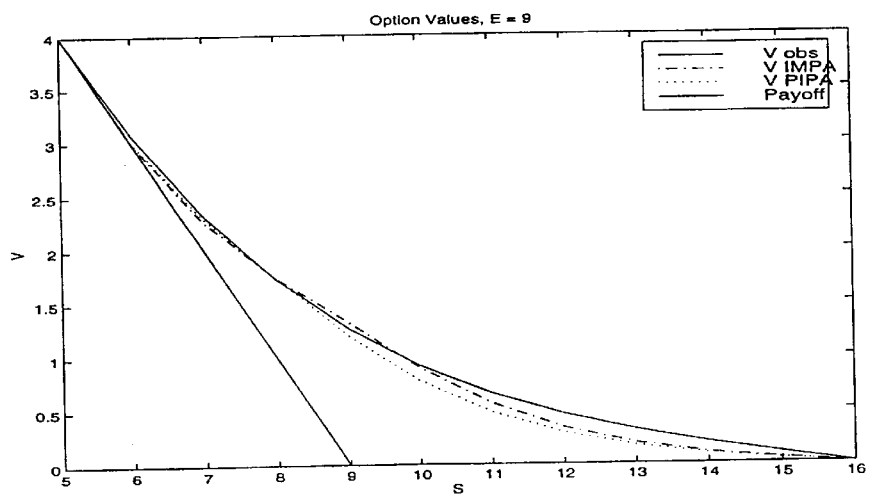
Fig. 16 : Example 3, options values calculated using constant/PIPA/IMPA volatility surfaces, E = 9

APPARATUS AND METHOD OF PRICING FINANCIAL DERIVATIVES

BACKGROUND OF THE INVENTION

The pricing of an option of an asset is a fundamental problem of significant practical importance in today's financial markets. In 1973, a mathematician, Fischer Black, and an economist, Myron Scholes, devised one of the first mathematically accepted approaches for pricing what is known as a "European" option, which are options that can.only be exercised at its expiration date. What has become known as the Black-Scholes option formula was described first in "The pricing of options and corporate liabilities," *Journal of Political Economy* 81 (1973). The Black-Scholes option formula is presently of widespread use in financial markets all over the world. The price of such an option can be found by solving the Black-Scholes equation with the initial condition at expiration (i.e., the payoff of the option). The Black-Scholes equation is a reverse diffusion equation with parameters determined by the statistical characteristics of involved stocks and currencies such as risk free interest rate, holding cost or expected dividends, and volatility.

As an example, the Black-Scholes formula for the theoretical price of a vanilla European call option is:

$$C(S, t) = SN(d_1) - Ee^{-r(T-t)} N(d_2), \quad (1)$$

where the notation is fairly standard, as described by P. Wilmott, J. N. Dewynne and S. Howison, *Option Pricing: Mathematical Models and Computation*, Oxford Financial Press, Oxford (1993).

Unlike a European option, an "American" option gives the owner of the option the right of exercising the option before its expiration date. In recent years, the American option has become more prevalent than the European option. Due to the additional feature of early exercise, the pricing of an American option is generally considered to be more difficult than the pricing of a European option, especially when one considers "exotic" options which are variations and refinements of a basic American option. From a mathematical point of view, part of this difficulty is due to the price of American options obeying the Black-Scholes equation only in the region where it is statistically appropriate to hold the option rather than to exercise it immediately.

Therefore, in the case of American options, the above formula (1) and its analogs are no longer valid. In fact, as shown in P. Jaillet, D. Lamberton, and B. Lapeyre, "Variational inequalities and the pricing of American options," *Acta Applicandae Mathematicae* 21 (1990) 263–289, a rigorous mathematical model for pricing an American option is an infinite-dimensional free boundary problem. As such, there is in general no explicit formula or finite procedure for computing the exact price of an American option. As a result, various mathematical models have been devised in an attempt to approximate the price of such options.

However, the option prices computed from a mathematical model are of a theoretical nature. In computing these prices, various inputs are fed into the model and an algorithm produces an answer. In practice, the computed prices may not be consistent with the observed market prices, e.g., the prices on the trading floor. Ideally, these two sets of prices should coincide. However, such a result is difficult, if not impossible, using known models. Two principal reasons for this are: (i) the assumptions that lead to the construction of the mathematical model may not be realistic; and (ii) the inputs to the model are not correct.

Knowing the correct inputs is crucial to the success of any pricing model. Ideally the two sets of option prices, computed and observed, are within an acceptable range of one another. In general, the problem of computing a proper set of inputs to a forward pricing model so that the computed outputs obey certain prescribed criteria is called an "inverse" pricing problem. One such input which is crucial to the forward pricing model of American options is the implied volatility of an option. The volatility of an asset is an important input to an option pricing model and it is also an input that is most difficult to estimate. Black and Scholes assumed this parameter to be a constant when deriving their famous formula for the theoretical price of a vanilla European call option. In the above equation (1), for example, the two constants $d_1$ and $d_2$ contain the volatility parameter $\sigma$. As it is now well known, this parameter is, in general, not a constant; indeed it is a highly complicated function of several deterministic and random factors.

Previous approaches for dealing with this difficult problem of unknown volatility are numerous and include: (i) statistical estimation methods based on historical data (such as J. Hull, *Options, Futures, and Other Derivative Securities*, Second Edition, Prentice Hall, New Jersey (1989), Section 10.4 and R. Gibson, Option Valuation: Analyzing and Pricing Standardized Option Contracts, McGraw-Hill, New York (1991), Section 1; (ii) mathematical models of stochastic volatilities such as those in J. Hull and A. White, "The pricing of options on assets with stochastic volatilities," *The Journal of Finance* 42 (1987) 281–300; H. Johnson and D. Shanno, "Option pricing when the variance is changing," *Journal of Financial and Quantitative Analysis* 22 (1987) 143–151; and (iii) implied volatilities based on observed option prices (suggested originally by H. A. Latant and R. J. Rendleman, "Standard deviations of stock price ratios implied in option prices," *The Journal of Finance* 31 (1976) 369–381 and empirically tested by S. Beckers, "Standard deviation implied in option prices as predictors of future stock price volatility" *Journal of Banking and Finance* 5 (1981) 363–381).

The problem of computing implied volatilities of (European or American) options is an instance of an inverse problem that is the counterpart of the forward problem of pricing these options. Specifically, in the forward option pricing problem, a constant volatility parameter, along with other constants, such as the interest rate and asset dividend, is taken as an input to a mathematical model that produces the theoretical or modeled option prices. By using an incorrect volatility parameter in the forward pricing model, the computed option price is bound to deviate, often substantially, from the option price observed on the trading floor.

SUMMARY OF THE INVENTION

An apparatus for and method of determining the price of financial derivatives such as options. One preferred embodiment of the invention employs a discretized partial differential linear complementarity problem (PDLCP) based system to determine the forward pricing of financial instruments such as vanilla American options. In this embodiment, an optimization problem in the form of a mathematical program with equilibrium constraints (MPEC) is implemented to derive implied volatilities of the assets underlying the subject derivatives. The implied volatilities thus derived are used as inputs in the PDLCP-based system to accurately determine the forward pricing of the subject derivatives.

BRIEF DESCRIPTION OF THE DRAWINGS

Many advantages, features, and applications of the invention will be apparent from the following detailed description of the invention which is provided in connection with the accompanying drawings in which:

FIG. 5 is a graph which depicts the volatility surface produced by the exemplary penalty interior point algorithm employed in accordance with a preferred embodiment of the invention;

FIG. 6 is a graph which depicts the volatility surface produced by the exemplary implicit programming algorithm employed in accordance with a preferred embodiment of the invention;

FIG. 7 is a graph which depicts the exemplary option values calculated using the volatility surface shown in FIGS. 5 and 6;

FIG. 8 is another graph which depicts the exemplary option values calculated using the volatility surface shown in FIGS. 5 and 6;

FIG. 9 is another graph which depicts the volatility surface produced by the exemplary, penalty interior point algorithm employed in accordance with a preferred embodiment of the invention;

FIG. 10 is another graph which depicts the volatility surface produced by the exemplary implicit programming algorithm employed in accordance with a preferred embodiment of the invention;

FIG. 11 is a graph which depicts the exemplary option values calculated using the volatitity surface shown in FIGS. 9 and 10;

FIG. 12 is another graph which depicts the exemplary option values calculated using the volatility surface shown in FIGS. 9 and 10;

FIG. 13 is another graph which depicts the volatility surface produced by the exemplary use of the penalty interior point method in accordance with a preferred embodiment of the invention;

FIG. 14 is another graph which depicts the volatility surface produced by the use of the implicit programming method in accordance with a preferred embodiment of the invention;

FIG. 15 is a graph which depicts the option values calculated using the exemplary volatility surface shown in FIGS. 13 and 14; and FIG. 16 is another graph which depicts the option values calculated using the exemplary volatility surface shown in FIGS. 13 and 14.

DETAILED DESCRIPTION OF PREFERRED EMBODIMENTS

Preferred embodiments and applications of the invention will now be described with reference to FIGS. 1–16. Other embodiments may be realized and structural or logical changes may be made to the disclosed embodiments without departing from the spirit or scope of the invention. Although the invention is particularly described as applied to the analysis, synthesis, and pricing of financial derivatives, particularly calculation and application to American options, it should be readily apparent that the invention may be applied to any other financial or economic instruments having the same or similar problems.

Figure 1:
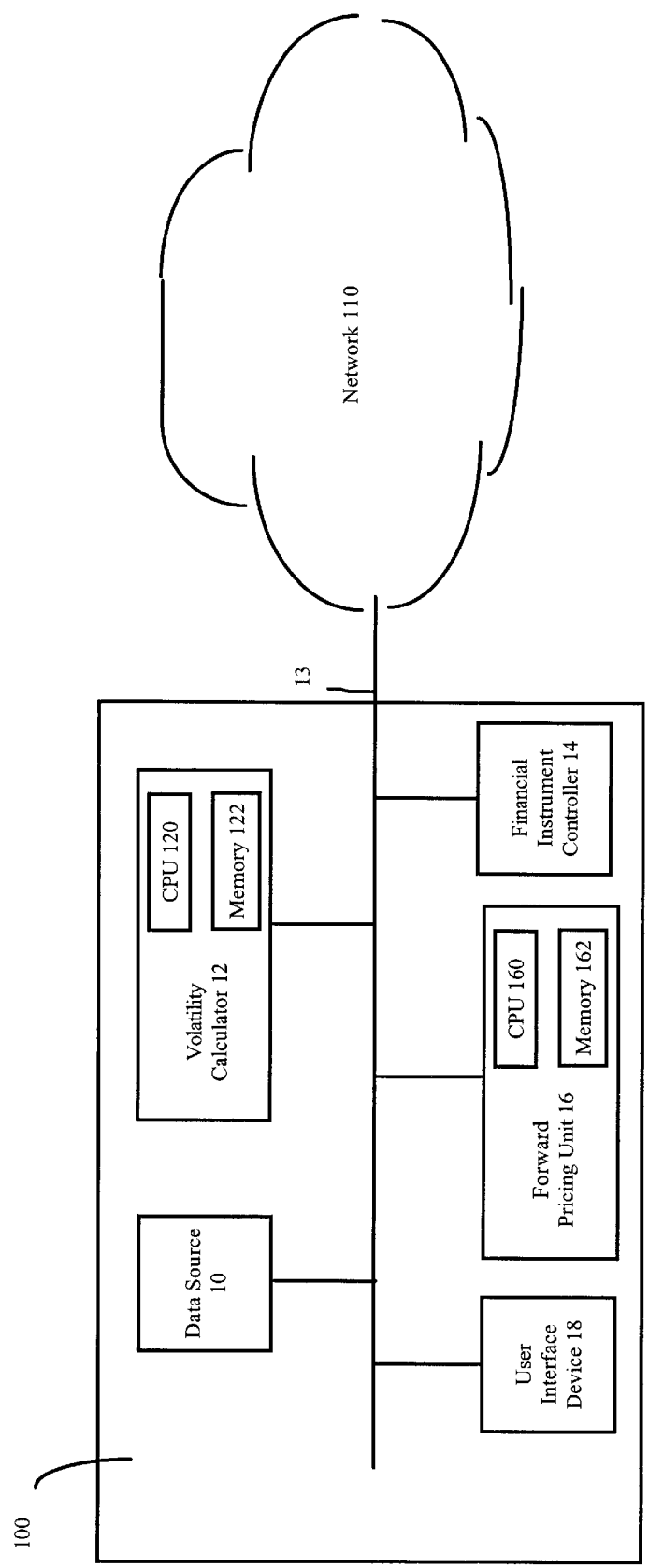
FIG. 1 is a block diagram of a financial engine in accordance with a preferred embodiment of the invention.

In a preferred embodiment, the invention is implemented in a financial instrument engine 100, as shown in FIG. 1, used to analyze financial and economic signals provided by the financial markets and, based upon user input data and commands, issue position statements or reports for use by the user (or other components or systems), as well as issuing control signals for use by automated systems to effect positions (e.g., increase, decrease, change, etc.) held by the user in the financial markets. The financial engine 100 may be a stand-alone computer hardware system, incorporated in (or distributed among) one or more locally or remotely located computer systems.

In a preferred embodiment, financial engine 100 is composed of a plurality of modules: data source 10, implied volatility calculator 12, financial instrument controller 14, forward pricing unit 16, and user interface device 18. In the illustrated embodiment, the modules are connected by a single transmission bus 13. (It should be understood that the illustration of bus 13 is merely representative of the various connectivity technologies available to those of ordinary skill in the art including single/multiple, wired, wireless, and other transmission mediums.) For illustrative purposes only, the modules depicted within financial engine 100 have been selected to illustrate a preferred embodiment of the invention that provides forward pricing of "vanilla" options (i.e., options limited to either buying or selling an underlying asset), particularly vanilla American options. The modules may be changed as needed for the specific financial instrument to be used (e.g., "exotic" options such as barrier options, digital options, compound options, Asian options, etc.).

In a preferred embodiment, data source 10 is used to provide external financial and economic data, signals, or other information to financial engine 100. Data source 100 may include one or more transmission links or connections (wired, wireless, etc.) to a variety of automatic quotation systems/services that provide current market data, and may also include its own information retrieval system(s). The information received by data source 100 is forwarded to one or more of the other modules depending on the particular information provided. Volatility calculator 12, which may be implemented using a computer program or algorithm (described below) executed by central processing unit (CPU) 120, and stored in memory 122, is used to calculate the implied volatility in price of the underlying asset of the American option.

Forward pricing unit 16, which may also be implemented using a computer program or algorithm (described below) stored in memory 162 and executed by CPU 160, receives information from data source 10, volatility calculator 12, and user interface device 18 to determine the forward price or value $V_{BS}(S, t)$ (as a function of the price (S) of the underlying asset over time (t)). User interface device 18 is used to exchange information between the user and financial engine 100. Depending on the commands to be implemented (e.g., forward price calculation, implied volatility calculation, option exercise, etc.), the information may include the observed market price of the underlying asset, volatility (local, implied, etc.), interest rate (e.g., risk-free), maturity (e.g., expiration date), strike price, dividend yield, and other pertinent information. (This information may also be provided by (or output to) data source 10.)

Financial instrument controller 14 may exchange information from all of the modules in financial engine 100.

Based on the information provided, financial instrument controller 14 can provide statements and reports to the user (e.g., containing pricing, volatility, position information, etc.) or to others through network 110, as well as provide a host of services based on the information such as controlling trading or allocation of funds in options (or other financial instruments), simulating market reactions based on input conditions, through signals output to network 110. (The depiction of network 110 is made to represent a variety of known networks and connected systems such as local or wide area networks, e.g., as a company intranet, the Internet, electronic communications network (ECNs), small order exchange systems (SOES), on-line brokers or other trading networks, etc.)

In order to accurately project or determine the forward price or value of financial or economic instruments such as American options, a preferred embodiment of the financial engine 100 utilizes an inverse pricing model to determine the inputs to be used by forward pricing unit 16 such that a more accurate forward theoretical price can result by solving the equation:

$$V_{BS}(S, t) = V_{obs} \qquad (2)$$

where $V_{obs}$ represents the value of the option observed in the market, for example, as reported by data source 10 or input to user interface device 18. In determining the forward option price, a preferred embodiment of the invention utilizes a calculation of the implied volatility of the underlying asset as determined by volatility calculator 12.

In a preferred embodiment, volatility calculator 12 includes CPU 120 that is used to execute a computer program or algorithm stored in memory 122. As will be discussed in detail below, in a preferred embodiment of the invention, the computer program calculates the implied volatilities of American options using a mathematical programming equilibrium constraints (MPEC) approach. A detailed explanation of the MPEC approach is given by Z. Q. Luo, J. S. Pang, and D. Ralph, in *Mathematical Program with Equilibrium Constraints*, Cambridge University Press, Cambridge (1996), which is incorporated herein by reference in its entirety.

Using the calculations made by volatility calculator 12, forward pricing unit 16 can project or determine the forward price or value of the option as a function of the price of the underlying asset and time. In a preferred embodiment, forward pricing unit 16 employs CPU 160 to execute a computer program or algorithm stored in memory 162. The computer program formulates the forward pricing task as a discretized linear complementarity problem (LCP), as described in "Option Pricing and Linear Complementarity," *Journal of Computational Finance* 2 (Fall 1998), by Jacqueline Huang and Jong-Shi Pang, which is incorporated herein by reference in its entirety. The basic framework of the forward pricing program is that of Black and Scholes, wherein the price of a risky asset is assumed to satisfy the following stochastic differential equation:

$$dS = \mu S dt + \sigma(S, t) S dW,$$

where S denotes the asset price that is a function of the time $t \in [0, T]$, with T>0 being the duration of a vanilla European option written on the asset, $\mu$ is the drift of the stochastic price process of the asset, dW is a standard Wiener process, and $\sigma(S, t)$ is the volatility that is taken to be an unknown function of the pair (S, t), which defines the volatility surface.

In a preferred embodiment, the value V(S, t) of an American option should satisfy the following partial differential linear complementarity problem (PDLCP) for t in [0, T] and S in [0, ∞):

$$0 \leq V(S, t) - \Lambda(S, t),$$
$$0 \geq \mathcal{L}_{BS}(V),$$
$$0 = [V(S, t) - \Lambda(S, t)]\mathcal{L}_{BS}(V), \qquad (3)$$

where $$\mathcal{L}_{BS} \equiv \frac{\partial}{\partial t} + \frac{1}{2}\sigma^2 S^2 \frac{\partial^2}{\partial S^2} + (r - D_0)S\frac{\partial}{\partial S} - r,$$

is the Black-Scholes partial differential operator, with r being the constant interest rate of a risk-free asset (e.g., U.S. government security), $D_0$ being the constant dividend rate of the asset, and $\Lambda(S, t)$ being the payoff function when early exercise occurs. Preferably, boundary values of V(S, t) at S=0 and S=∞, and terminal values of V(S, t) at t=T, the expiry time, are assumed.

In a preferred embodiment, the financial instrument engine 100 employs a finite difference scheme for approximating the partial differential equation (3). Specifically, the state variable S is truncated to a finite range $[0, N\delta S]$, where N is a positive integer and $\delta S > 0$ is the step size that will be used for discretizing the partial differentiation with respect to S. Preferably, a time step $\delta t > 0$ is used for which $M \equiv T/\delta t$ is an integer for, discretizing the partial differentiation with respect to t. In the program, the following approximations may be employed:

$$\frac{\partial V}{\partial t}(S, t) = \frac{V(S, t + \delta t) - V(S, t)}{\delta t} + O(\delta t),$$

$$\frac{\partial^2 V}{\partial S^2}(S, t) = \theta \frac{V(S + \delta S, t) - 2V(S, t) + V(S - \delta S, t)}{(\delta S)^2} +$$
$$(1 - \theta)\frac{V(S + \delta S, t + \delta t) - 2V(S, t + \delta t) + V(S - \delta S, t + \delta t)}{(\delta S)^2} + O((\delta S)^2),$$

$$\frac{\partial V}{\partial S}(S, t) = \theta \frac{V(S + \delta S, t) - V(S - \delta S, t)}{2\delta S} +$$
$$(1 - \theta)\frac{V(S + \delta S, t + \delta t) - V(S - \delta S, t + \delta t)}{2\delta S} + O((\delta S)^2),$$

where a function $f(x)$ is said to be $O(g(x))$ if $$\limsup_{g(x) \to 0} \frac{|f(x)|}{|g(x)|} < \infty$$

and $\theta \in [0, 1]$ is a given parameter whose specialization yields the explicit approximation ($\theta = 0$), the implicit approximation ($\theta = 1$), and the Crank-Nicolson approximation ($\theta = \frac{1}{2}$). Based on the above finite difference scheme and the initial and boundary values of V(S, t), the financial engine will derive the unknown option and volatility values at the grid points $(n\delta S, m\delta t)$, for $n=1, 2, \ldots, N-1$ and $m=0, 1, 2, \ldots M-1$, in the (state, time)-product space. Let $$V_{mn} = V(n\delta S, m\delta t) \text{ and } \sigma_{mn} = \sigma(n\delta S, m\delta t)$$

denote these unknown values. The boundary values $$V_{m0} = V(0, m\delta t), V_{mN} = V(N\delta S, m\delta t), V_{Mn} = V(n\delta S, T),$$

for $m=0, \ldots, M-1$ and $n=1, \ldots, N-1$ are all given. We also let $$\Lambda_{mn} = \Lambda(n\delta S, m\delta t)$$

denote the payoff function evaluated at the grid point $(\eta\delta S, m\delta t)$. For each m, let $V_m$, $\sigma_m$ and $\Lambda_m$, denote, respectively, the (N−1)-vectors $(V_{mn})_{n-1}^{N-1}$, $(\sigma_{mn})_{n-1}^{N-1}$ and $(\Lambda_{mn})_{n-1}^{N-1}$. Along with suitable boundary conditions, the PDLCP (3) is approximated by the following (M−1) LCPs, each of order (N−1): at each time $t=m\delta t$ for $m=M-1, M-2, \ldots, 1, 0$, $$0 \leq V_m - \Lambda_m \perp b_m(\sigma_m) + Q(\sigma_m)V_m + N(\sigma_m)V_{m+1} \geq 0 \quad (4)$$

where $\perp$ is the notation for "perpendicular to" and for an arbitrary (N−1)-vector $\omega$, $$Q(\omega) \equiv (\delta t^{-1} + r)I_{N-1} + L_\theta(\omega), \quad N(\sigma) \equiv -\delta t^{-1} I_{N-1} + L_{1-\theta}(\omega),$$

$$b_m(\omega) \equiv \frac{1}{2} \begin{pmatrix} \frac{1}{2}[\theta V_{m0} + (1-\theta)V_{(m+1)0}](r-D_0-\omega_1)\omega_1 \\ 0 \\ \vdots \\ 0 \\ -\frac{1}{2}[\theta V_{mN} + (1-\theta)V_{(m+1)N}](r-D_0+\omega_{N-1})\omega_{N-1} \end{pmatrix}$$

with $I_{N-1}$ being the identity matrix of order N−1 and $L_\alpha(\omega)$ being the (N−1)×(N−1) tridiagonal matrix whose entries are given by: for $i, j=1, 2, \ldots, N-1$, $$(L_\alpha(\omega))_{ij} \equiv \begin{cases} -\frac{\alpha}{2}i^2\omega_i^2 + \frac{\alpha}{2}i(r-D_0) & \text{if } j=i-1 \\ \alpha i^2\omega_i^2 & \text{if } j=i \\ -\frac{\alpha}{2}i^2\omega_i^2 - \frac{\alpha}{2}i(r-D_0) & \text{if } j=i+1 \\ 0 & \text{otherwise.} \end{cases}$$

Provided that $$\frac{1}{\delta t} + r \geq N(r - D_0), \quad (5)$$

the matrix $L_\alpha(\omega)$, and hence $Q(\sigma_m)$ is strictly diagonally dominant, thus positive definite, for all vectors $\omega$ and scalars $\alpha \in [0, 1]$. It is assumed that the condition of equation (5) on $\delta t$ is satisfied.

To solve the forward pricing problem where the volatilities $\sigma_{mn}$ are all given, the LCPs (4) are time stepped starting with $m=M-1$; since $V_M$ is known, by solving the LCP at time $t=(M-1)\delta t$, a unique solution $V_{M-1}$ can be obtained. Proceeding backward in time, a set of discrete option prices $V_{MN}$ can be computed, that depend on the input volatilities $\sigma_{mn}$. In order to better illustrate the details of this dependence the M LCPs (4) are written as an aggregate LCP of size M(N−1). Indeed, define the M(N−1)×M(N−1) matrix:

$$A(\sigma) \equiv \begin{bmatrix} Q(\sigma_0) & N(\sigma_0) & & & \\ & Q(\sigma_1) & N(\sigma_1) & & \\ & & \ddots & \ddots & \\ & & & Q(\sigma_{M-2}) & N(\sigma_{M-2}) \\ & & & & Q(\sigma_{M-1}) \end{bmatrix}$$

and the M(N−1)-vector $$b(\sigma) \equiv \begin{bmatrix} b_1(\sigma_1) \\ \vdots \\ b_M(\sigma_M) \end{bmatrix}$$

where $\sigma$ is the M(N−1)-vector whose entries are the discretized volatilities $\sigma_{mn}$ for $m=0, \ldots, M-1$ and $n=1, \ldots, N-1$:

$$\sigma \equiv \begin{pmatrix} \sigma_0 \\ \vdots \\ \sigma_{M-1} \end{pmatrix}.$$

Similarly, we define the aggregate M(N−1)-vectors of option prices and payoffs:

$$V \equiv \begin{pmatrix} V_1 \\ \vdots \\ V_M \end{pmatrix} \quad \text{and} \quad \Lambda \equiv \begin{pmatrix} \Lambda_1 \\ \vdots \\ \Lambda_M \end{pmatrix}.$$

The above time-stepping scheme for computing the forward prices of a vanilla American option can be summarized as the following LCP of size M(N−1):

$$0 \leq V - \Lambda \perp b(\sigma) + A(\sigma)V \geq 0. \quad (6)$$

Under the condition (5), $A(\sigma)$, preferably being a block upper triangular matrix with positive definitive diagonal blocks, is a P-matrix, albeit $A(\sigma)$ is not symmetric or positive definite. A comprehensive treatment of P-matrices and the LCP is described in R. W. Cottle, J. S. Pang, and R. S. Stone, *The Linear Complementarity Problem*, Academic Press, Boston (1992), which is incorporated herein by reference in its entirety. $A(\sigma)$ depends on the finite-difference scheme preferably being used to discretize the Black-Scholes partial differential operator $L_{BS}$ and is independent of the option, i.e., the payoff function and the expiration. Presumably, if a different discretization of this operator is used, a different matrix is obtained. The embodiment presented below applies to other discretization schemes as well, provided that the resulting $A(\sigma)$ is a P-matrix. In contrast to $A(\sigma)$, the vectors $\Lambda$ and $b(\sigma)$ are both dependent on the option.

In another embodiment of the invention, multiple options written on the same underlying asset may be present. In such a case the LCP (6) can be embedded in a larger system in accordance with the preferred embodiment of the invention. Specifically, suppose that there are K American options each being characterized by its payoff function $\Lambda^k(S, t)$ at exercise. The prices of these options are all calculated under the same volatility function $\sigma(S, t)$ of the asset. Thus for each $k=1, \ldots, K$, the LCP:

$$0 \leq V^k - \Lambda^k \perp b^k(\sigma) + A(\sigma)V^k \geq 0,$$

is solved to obtain the discretized option prices $V^k_{mn}$ of type k. Preferably, all these LCPs may be defined by the same matrix $A(\sigma)$. Concatenating these K LCPs, the final LCP formulation is determined for the forward pricing problem of multiple American options on a single asset:

$$0 \leq x - p \perp q(\sigma) + M(\sigma)x \geq 0, \quad (7)$$

where $$x \equiv (V^k)_{k=1}^K, \quad p \equiv (\Lambda^k)_{k=1}^K,$$

are, respectively, the KM(N−1)-dimensional vectors of unknown option prices and known payoffs at the discretized grid points, $$q(\sigma) \equiv (b^k(\sigma))_{k=1}^K,$$

is the KM(N−1)-dimensional vector that contains the given initial and boundary values of the options, and M(σ) is the KM(N−1)×KM(N−1) block diagonal matrix all of whose K diagonal blocks are equal to the M(N−1)×M(N−1) matrix A(σ).

Thus, the forward option pricing problem is implemented by the program as the LCP (7), referred to herein as the "forward option LCP." The forward option LCP preferably requires the discretized volatility matrix σ as an input, while the output from the forward option LCP yields the discrete option prices $V^k(n\delta S, m\delta t)$ of K options. By the P-property of the matrix M(σ), the forward option LCP has a unique solution x(σ) that depends on the input volatilities. This option function x(σ) is only implicitly known; for any given σ, x(σ) can be evaluated by solving the forward option LCP.

The optimization problem overcome by financial engine 100 of the joint computation of the volatility matrix σ and the option price vector x(σ) is subject to a set of criteria that is the result of some input or detected market considerations. Preferably, the constraints on the unknown volatilities are modeled by the set $\Gamma \subseteq R^{M(N-1)}$ in the computer program stored in memory 122. The constraints preferably include, for example, upper and lower bounds on σ and may include any other constraints known or desired in the art. The objective is described by the function θ(σ, x). A variety of objective functions may serve as the fundamental basis for the computations. θ(σ, x) may be, for example, a standard least-squares deviation from observed option prices and historical volatilities. More precisely, a subset of option prices $V^{obs,k}_{mn}$ with (k, m, n) belonging to a subset O of $\{1, \ldots, K\} \times \{0, \ldots, M-1\} \times \{1, \ldots, N-1\}$ and a subset of volatilities $\sigma^{his}_{mn}$ with (m, n) belonging to a subset S of $\{0, \ldots, M-1\} \times \{1, \ldots, N-1\}$ are given (e.g., the observed market prices and historical volatilities). Knowing (σ, x) allows the computed values to be minimally deviated from the given values. Mathematically, the objective function is then represented by:

$$\theta(\sigma, x) \equiv \sum_{(k,m,n)\in O} (V^k_{mn} - V^{obs,k}_{mn})^2 + \sum_{(m,n)\in S} (\sigma_{mn} - \sigma^{his}_{mn})^2,$$

where $V^k_{mn}$ is the theoretical option price (collectively, these prices are the components of x). Another example of θ would be a function similar to the one used in T. Coleman, Y. Li and A. Verma, "Reconstructing the unknown local volatility function," *Risk* (1998), which is incorporated herein by reference in its entirety.

In a preferred embodiment, financial engine 100 computes a discretization of the volatility surface so that a prescribed objective function is minimized subject to given constraints on the unknown volatilities and option prices that includes a measure of the smoothness of the discretized volatility surface. Variations of these functions and/or other realistic objective functions are amenable to the same implementation.

In accordance with a preferred embodiment of the invention, with the set Γ and the objective function θ given, the implied volatility problem of American options is implemented by the computer program as the following constrained optimization problem: compute (σ, x) to minimize θ(σ, x)

subject to σ∈Γ and $0 \leq x - p \perp q(\sigma) + M(\sigma)x \geq 0.$ (8)

In terms of the option function x(σ), this optimization problem may be rewritten as an implicit program in the variable σ alone:

minimize φ(σ)≡θ(x(σ), σ)

subject to σ∈Γ.

The terms σ and x are vectors in the Euclidean spaces $R^{M(N-1)}$ and $R^{KM(N-1)}$, respectively. Let $$F(\sigma, x) \equiv q(\sigma) + M(\sigma)x$$

be the function defining the option LCP (7). The partial Jacobian matrix of F(σ, x) with respect to σ is denoted $J_\sigma F(\sigma, x)$; since F(σ, x) is linear in x, the partial Jacobian matrix of F(σ, x) with respect to x is equal to the matrix M(σ). For an arbitrary σ, three index sets can be defined associated with the solution x(σ):

$$\alpha(\sigma) = \{i : (x(\sigma) - p)_i > 0 = (q(\sigma) + M(\sigma)x)_i\}$$

$$\beta(\sigma) = \{i : (x(\sigma) - p)_i = 0 = (q(\sigma) + M(\sigma)x)_i\}$$

$$\gamma(\sigma) = \{i : (x(\sigma) - p)_i < 0 = (q(\sigma) + M(\sigma)x)_i\}.$$

These index sets play an important role in the local properties of x(σ) when σ undergoes small perturbations. The particular case where β(σ), called the degenerate set, is the empty set is particularly noteworthy. This case corresponds to the solution x(σ) being nondegenerate. As seen from the theorem below, x(.) is then locally smooth around this value σ. Similar to the "big O" notation, $f(x) = o(g(x))$ can be written if $$\lim_{g(x)\to 0} \frac{f(x)}{g(x)} = 0.$$

The following result summarizes the key properties of the option function x(σ).

Assuming that the condition (5) holds, the option function x(σ) is Lipschitz continuous and directionally differentiable in its argument $\sigma \in R^{M(N-1)}$. The directional derivative of x(σ) at any $\sigma \in R^{M(N-1)}$ along any direction $d\sigma \in R^{M(N-1)}$, denoted x'(σ; dσ), is the unique solution $dx \in R^{KM(N-1)}$ to the following mixed LCP:

$$\begin{cases} (J_\sigma F(\sigma, x(\sigma))d\sigma + M(\sigma)dx)_i = 0, & \forall\, i \in \alpha(\sigma), \\ 0 \leq (dx)_i \perp (J_\sigma F(\sigma, x(\sigma))d\sigma + M(\sigma)dx)_i \geq 0, \\ & \forall\, i \in \beta(\sigma), \\ (dx)_i = 0, & \forall\, i \in \gamma(\sigma). \end{cases} \quad (10)$$

Furthermore, $$x = (\sigma + d\sigma) = x(\sigma) + x'(\sigma; d\sigma) + o(\|d\sigma\|). \quad (11)$$

Finally, if β(σ) is empty, then x is Fréchet differentiable at σ.

In a preferred embodiment, the implied volatility problem as formulated as either (8) or (9) preferably has a solution if the objective function $\theta(\sigma, x)$ is continuous and the feasible volatility region $\Gamma$ is compact.

Thus, in a preferred embodiment where the objective function $\theta(\sigma, x)$ is continuous and $\Gamma$ is compact, then an optimal solution to (8) exists.

A consequence of programming financial engine 100 in this manner is that it provides a computationally effective way of approximately updating a set of option values when the volatilities undergo small perturbations, without recomputing the exact values from scratch. Indeed, the formula (11) yields $$x(\sigma') \text{ approx. equal to } x(\sigma)+x'(\sigma; d\sigma), \text{ where } d\sigma \equiv \sigma'-\sigma$$

preferably with $\sigma'$ being a sufficiently small perturbation of $\sigma$. Thus, financial engine 100 can compute an approximation to $x(\sigma')$ from $x(\sigma)$ by simply computing the directional derivative $x'(\sigma, d\sigma)$. In general, the computation of this derivative involves the solution of a mixed LCP of reduced size. The latter problem may be of reduced size because the last equation in (10) allows the $\gamma$-components of dx to be fixed at zero. For example, when $x(\sigma)$ is a nondegenerate solution (i.e., when $\beta(\sigma)$ is empty), the mixed LCP (10) reduces to a single system of linear equations involving only the variables $dx_i$ for $i\in\alpha(\sigma)$. In the general case, the mixed LCP (10) is preferably solved as stated or converted into a standard LCP involving only the variables $dx_i$ for $i\in\beta(\sigma)$, by using the first equation in (10) to eliminate the variables $dx_i$ for all $i\in\alpha(\sigma)$.

Since the option function $x(\sigma)$ is preferably not a smooth function, (9) is a nonsmooth optimization problem in general. Nevertheless, if the original objective function $\theta(\sigma, x)$ is smooth, then the composite objective function $\phi(\sigma)$ is "B(ouligand)-smooth," meaning that it is locally Lipschitz continuous and directionally differentiable. As such, a descent method can be applied in solving the problem (9) in accordance with a preferred embodiment of the invention. Furthermore, the "B-derivative" of $\phi$ can be used to describe the stationarity conditions of the program (9).

Figure 2:
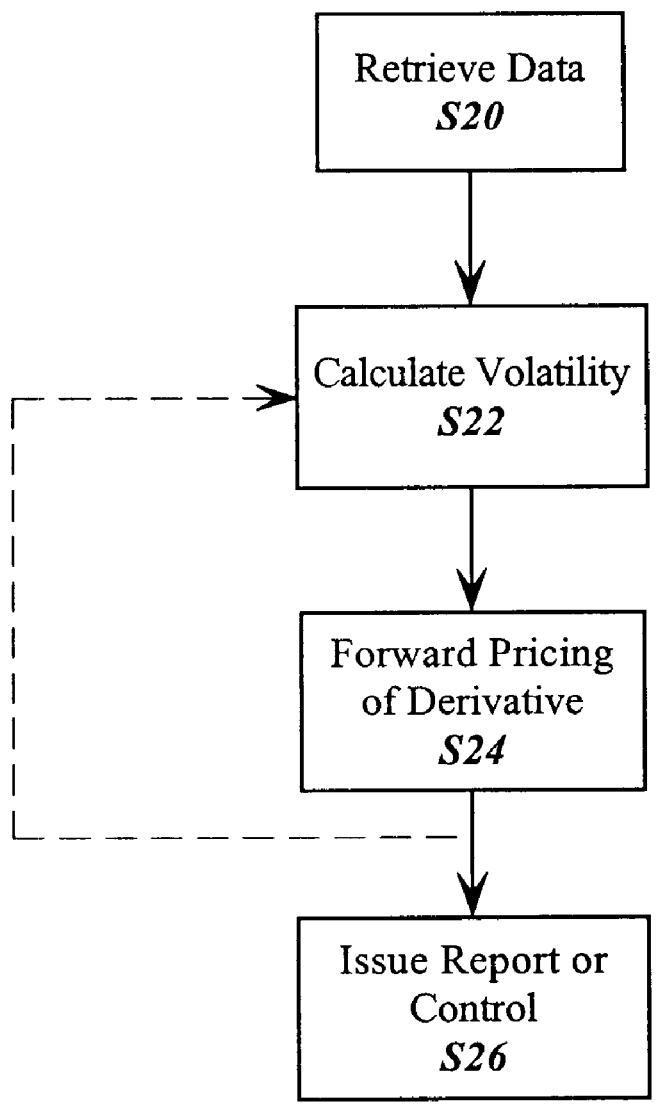
FIG. 2 illustrates a flow chart which describes the operational flow of a preferred embodiment of the invention.
Figure 3:
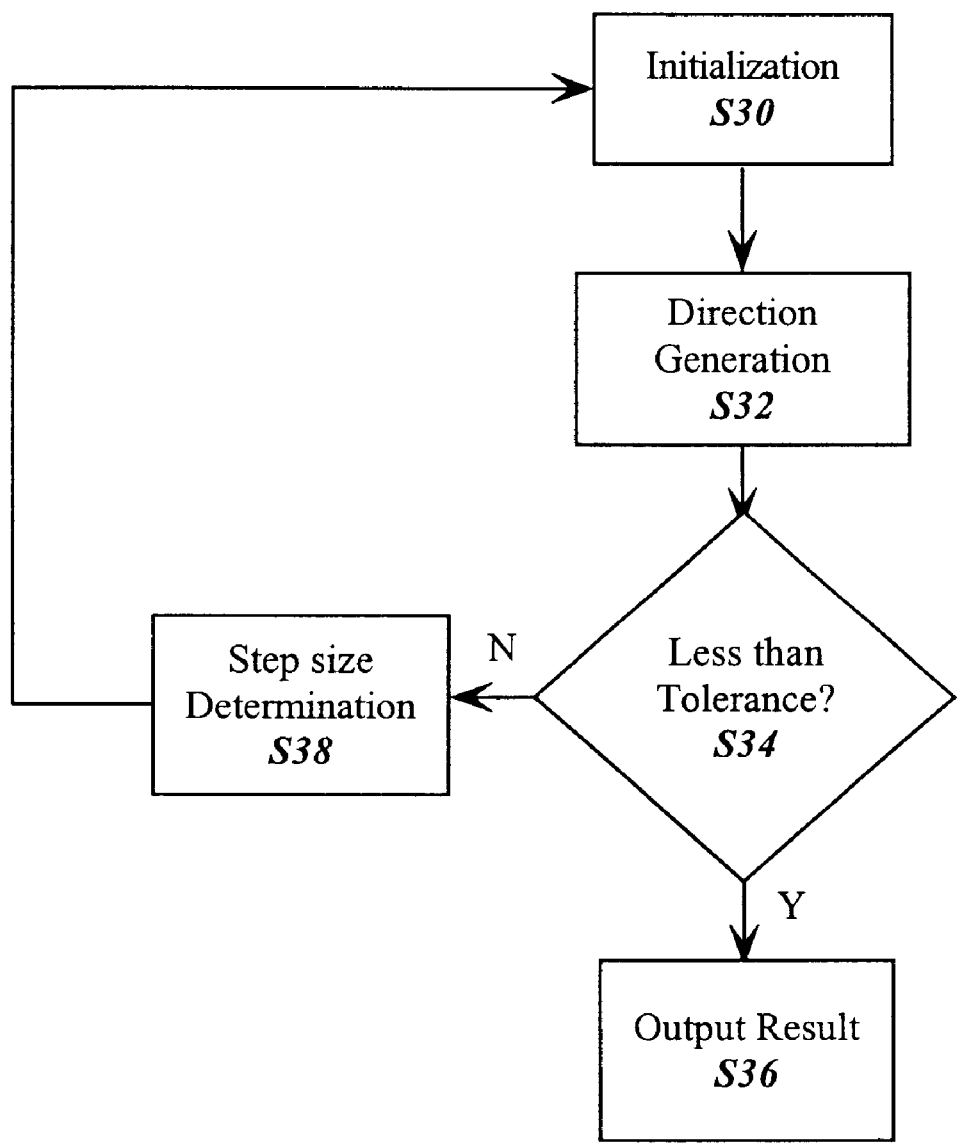
FIG. 3 illustrates a flow chart which describes a preferred embodiment of the invention that employs an implicit programming algorithm (IMPA)

The operation of the financial engine 100 in accordance with a preferred embodiment of the invention can be used to implement the method of pricing financial derivatives such as vanilla American options shown in FIG. 2. In the retrieval step S20, for example, both data source 10 and user interface device 18 can be used to retrieve data to be input into one or more of the modules contained in financial engine 100. In one embodiment, for example, initial parameters such as the price of the underlying asset (e.g., stock price), risk-free interest rate, maturity date of derivative, dividend yield, and initial volatility parameter can be input to forward pricing unit 16 through data source 10 and/or user interface device 18. Based on this information, initial option pricing data can be determined and output by forward pricing unit 16 for use by other modules in financial engine 100, including volatility calculator 12 (as represented by the broken line path in FIG. 2). Volatility calculator 12, for example, may utilize the theoretically calculated option price for comparison with observed option prices input from data source 10 (or user interface device 18) in optimizing its calculations (in step S22) of the volatility implied from the market, as will be discussed in detail below.

Once optimized, the implied volatilities calculated in S22 are used as inputs by forward pricing unit 16, together with additional inputs to derive the forward price of the subject derivative (e.g., vanilla American option). The forward pricing information can then be included in a report output to the user via, for example, user interface device 18, or via network 110 (in step S26). The may include the volatility calculation itself, the forward pricing data, additional calculations based on the calculated data (e.g., positions taken, projected, predicted, simulated, etc.), and other pertinent data. The calculated volatility and pricing information may also be used in effecting trading by issuing control signals through financial instrument controller 14 or the like (step S26) to trading systems (represented by network 110) based on the calculations made in steps S22 and S24.

The calculations made within step S22 may be performed, in accordance with a preferred embodiment of the invention, through the use of computer program or algorithm referred to herein as "Implicit Programming Algorithm (IMPA)" of the invention. In a preferred embodiment, IMPA is used by financial engine 100 to solve the implied volatility problem based on the optimization formulation (9). For illustration purposes, the feasible volatility region $\Gamma$ is assumed to be a relatively simple set such as a polyhedron; as a result, the directional subprograms in IMPA can be easily solved.

With $\phi(\sigma)$ being directionally differentiable, an iterative descent algorithm of the sequential quadratic programming kind is employed to minimize the formulation (9). In describing IMPA we let $\sigma^\nu \in \Gamma$ be a given volatility vector that is not stationary for (9). Write $x^\nu \equiv x(\sigma^\nu)$ and $$\alpha_\nu \equiv \alpha(\sigma^\nu), \beta_\nu \equiv \beta(\sigma^\nu), \text{ and } \gamma_\nu \equiv \gamma(\sigma^\nu).$$

A descent direction of the objective function $\phi(\sigma)$ at $\sigma^\nu$ can be generated by solving the following minimization problem: for any symmetric positive definite matrix $$Q_\nu \in R^{M(N-1)\times M(N-1)},$$

minimize $\phi'(\sigma^\nu; d\sigma)+\tfrac{1}{2}d\sigma^T Q_\nu d\sigma$ subject to $\sigma^\nu+d\sigma\in\Gamma$.

Since $$\phi'(\sigma^\nu; d\sigma)=\nabla_\sigma\phi(\sigma^\nu, x^\nu)^T d\sigma+\nabla_x\phi(\sigma^\nu, x^\nu)^T x'(\sigma^\nu; d\sigma),$$

the above directional minimization problem is equivalent to:

minimize $\nabla_\sigma\phi(\sigma^\nu, x^\nu)^T d\sigma+\nabla_x\phi(\sigma^\nu, x^\nu)^T dx+\tfrac{1}{2}d\sigma^T Q_\nu d\sigma$ subject to $\sigma^\nu+d\sigma\in\Gamma$ $(J_\sigma F(\sigma^\nu, x^\nu)d\sigma+M(\sigma^\nu)dx)_i=0, \forall i\in\alpha_\nu,$ $0\leq(dx)_i\perp(J_\sigma F(\sigma^\nu, x^\nu)d\sigma+M(\sigma^\nu)dx)_i\geq 0, \forall i\in\beta_\nu,$ $(dx)_i=0, \forall i\in\gamma_\nu,$ (12)

where the directional derivative $x'(\sigma^\nu; d\sigma)$ has been substituted. The latter optimization problem is another MPEC whose solution is not trivial. A preferred embodiment provides a solution which simplifies directional computation while providing accurate results for implied volatility inputs. The method of solving the optimization problem is an implicit programming algorithm (IMPA) formulated in accordance with the invention. The following additional notation is used in the description of the use of IMPA in the preferred embodiment illustrated in FIG. 3:

$\phi_\nu \equiv \phi(\sigma^\nu, x^\nu), d\phi_\sigma^\nu \equiv \nabla_\sigma\phi(\sigma^\nu, x^\nu), d\phi_x^\nu \equiv \nabla_x\phi(\sigma^\nu, x^\nu),$ and $J_\sigma F^\nu \equiv J_\sigma F(\sigma^\nu, x^\nu).$ An initialization step S30 initializes parameters $\rho, \gamma\in(0, 1)$ as given scalars and $Q_0$ as a given symmetric positive definite matrix of order $M(N-1)$. $\sigma^0\in\Gamma$ is also given, and $\nu=0$ is set.

A direction generation step S32 allows β' to be an arbitrary subset of $\beta_v$, and solves the convex quadratic program $$\text{minimize } (d\phi_\sigma{}^v)^T d\sigma + (d\phi_x{}^v)^T dx + \tfrac{1}{2} d\sigma^T Q_v d\sigma$$

subject to $\sigma^v + d\sigma \in \Gamma$ $(J_\sigma F^v d\sigma + M^v dx)_i = 0, \forall i \in \alpha_v \cup \beta'$, $(dx)_i = 0, \forall i \in \gamma_v \cup (\beta_v \setminus \beta')$, (13)

to obtain the search direction dσ and the auxiliary vector dx, both of which is preferably necessarily unique.

In the termination test step S34 a check is made to determine if the computed implied volatility is within acceptable values, e.g., if $\|d\sigma\| \leq$ prescribed tolerance, IMPA is stopped, as shown in step S36, and the pair $\sigma^v$, $x^v$ is taken to be the desired approximate solution of (9). If $\|d\sigma\| >$ prescribed tolerance IMPA is continued with step S38. The step size determination step S38 requires that with $\sigma^v(\tau) \equiv \sigma^v + \tau d\sigma$ and $x^v(\tau) \equiv x(\sigma^v(\tau)), \forall \tau \in [0, 1]$, (14)

set $\tau_v = \max(0.01, \rho^{l_v})$ where $l_v$ is the smallest nonnegative integer l such that with $\tau = \rho^l$, $\phi(\sigma^v(\tau), x^v(\tau)) - \phi_v \leq \gamma\tau[(d\phi_\sigma{}^v)^T d\sigma + (d\phi_x{}^v)^T dx]$.

Set $\sigma^{v+1} \equiv \sigma^v(\tau_v)$. A symmetric positive definite matrix $Q_{v+1}$ is chosen and v is replaced by v+1. IMPA then returns to step S30.

The choice of the matrices {Q} could presumably affect the practical performance of the algorithm. Preferably, the matrices {Q} are chosen to reflect some second-order information of the objective function $\phi(\sigma, x)$. In a preferred embodiment, a lower bound of 0.01 on the step size is used. The step size determination is preferably the well-known Armijo inexact line search rule in standard unconstrained optimization algorithms, although other known rules may be used. A convergence analysis of the algorithm without the modification of the directional step may be used as described in Z. Q. Luo, J. S. Pang, and D. Ralph, *Mathematical Program with Equilibrium Constraints*, Cambridge University Press, Cambridge (1996), which is incorporated herein by reference in its entirety.

In another embodiment of the invention, a computer program or algorithm for solving the implied volatility problem based upon formulation (8) is provided, which is referred to herein as the "Penalty Interior Point Algorithm (PIPA)," and executed by financial engine 100. For illustration purposes, the feasible volatility region Γ is assumed to be a relatively simple set such as a polyhedron; as a result, the directional subprograms in PIPA can be easily solved. Unlike IMPA (described above) that originates from an iterative descent algorithm for solving smooth nonlinear programs, PIPA originates from a penalty method coupled with an interior point routine to deal with complementarity constraint in the other formulation (8) of the implied volatility problem.

In a preferred embodiment, PIPA is executed by volatility calculator 12 to operate on the following reformulation of (8):

minimize θ(σ, x)

subject to σ∈Γ

Figure 4:
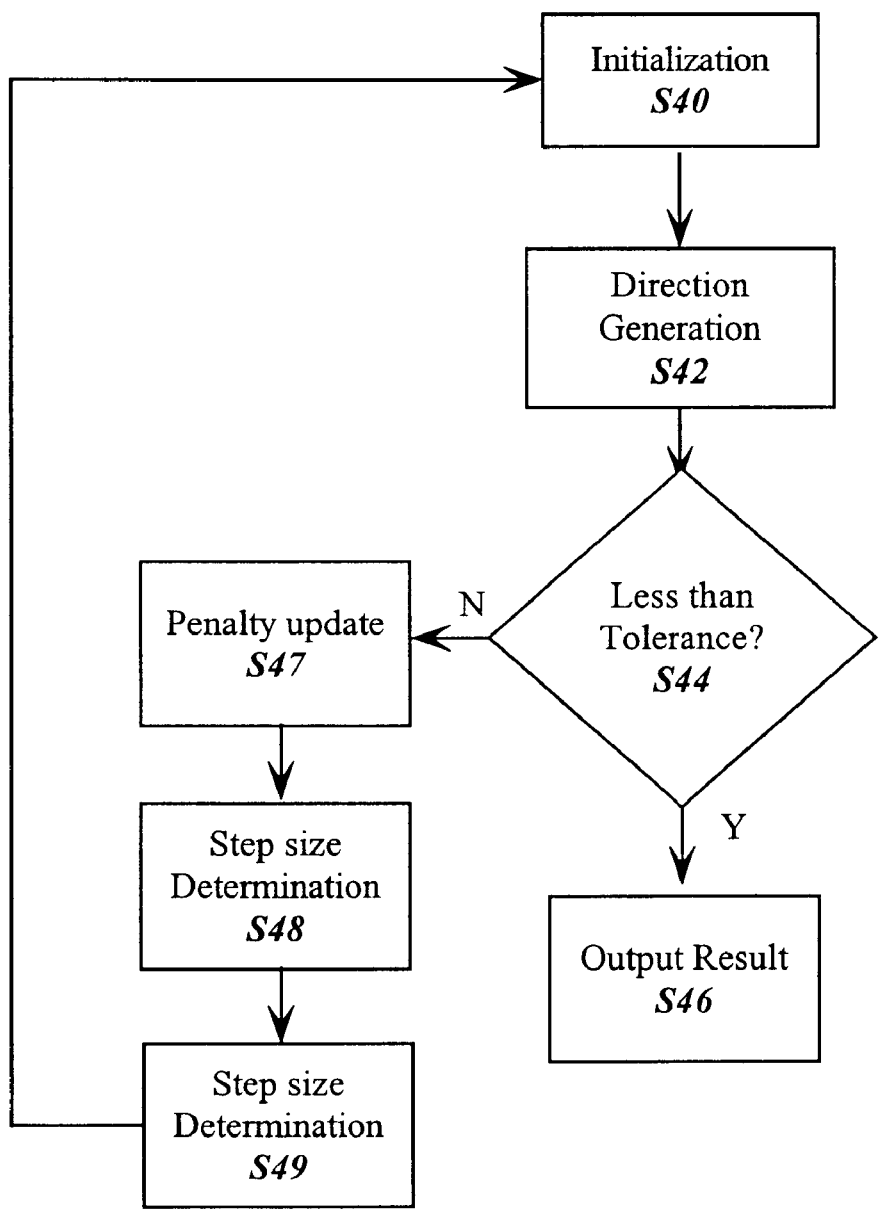
FIG. 4 illustrates a flow chart which describes a preferred embodiment of the invention that employs a penalty interior point algorithm (PIPA)

$w - q(\sigma) - M(\sigma)x = 0$ $w \bigcirc (x-p) = 0$ $(w, x-p) \geq 0$ where ◯ denotes the Hadamard operator on two vectors; that is, w◯x is the vector whose i-th component is equal to the product of the i-th components of w and x. The following additional notation is useful in describe the use of PIPA in a preferred embodiment of the invention, as shown in FIG. 4.

$G(\sigma, x, w) \equiv w - q(\sigma) - M(\sigma)x \equiv w - F(\sigma, x)$

In addition, the residual function of the complementarity conditions is preferably defined as:

$r(\sigma, x, w) \equiv (G(\sigma, x, w))^T G(\sigma, x, w) + (x-p)^T w$

The penalized objective function is preferably defined as:

$P_c(\sigma, x, w) \equiv \theta(\sigma, x) + c r(\sigma, x, w)$, where c>0 is a penalty scalar to be adjusted. For a given vector x, diag(x) is assumed to be the diagonal matrix whose diagonal entries are the components of this vector.

PIPA is an iterative algorithm that generates a sequence of iterates $\{(\sigma^v, x^v, w^v)\}$ preferably satisfying the following conditions for all v:

a. (feasible volatilities) $\sigma^v \in \Gamma$;

b. (positivity of state variables) $x^v - p > 0$ and $w^v > 0$; and c. (centrality condition) $(x^v - p) \bigcirc w^v \geq \eta g_v 1_{M(N-1)}$, where $\eta \in (0, 1)$ is a given scalar, $1_{M(N-1)}$ is the M(N−1)-vector of all ones, and $$g_v \equiv \frac{(x^v - p)^T (w^v)}{M(N-1)}$$

is the average "complementary gap" between $x^v$ and $w^v$.

While maintaining these conditions, PIPA as executed by volatility calculator 12 attempts to decrease the objective function θ(σ, x) by reducing the penalty function Pc(σ, x, w). In a preferred embodiment, this can be accomplished via an Armijo inexact line search using a properly defined search direction and a proper choice of the penalty scalar c. PIPA drives the residual r(σ, x, w) toward zero, thereby achieving feasibility to the MPEC, and obtains a satisfactory "minimum" value of the objective θ(σ, x).

At the beginning of each iteration v, a triple $\sigma^v$, $x^v$, $w^v$ satisfying the above conditions is preferably given. Consistent with the notation used so far, the triple can be written:

$G^v \equiv G(\sigma^v, x^v, w^v)$ and $r_v \equiv r(\sigma^v, x^v, w^v)$.

At this triple, a Newton linearization step is applied to the equation:

$w - q(\sigma) - M(\sigma)x = 0$ and also to the following perturbed complementarity equation:

$$w \bigcirc (w-q) = \kappa g_\nu 1_{M(N-1)},$$

where $\kappa$ is a given constant in the interval (0, 1). The resulting linear equations are preferably used to define a directional quadratic program whose solution yields a search direction along which the aforementioned line search is carried out.

As shown in FIG. 4, running PIPA calculator 12 initializes (8) in initialization step S40 by letting $\rho, \gamma, \kappa_0$, and $\eta$ be given scalars in the interval (0, 1). In addition, $c_{-1} \geq 1$ and $\zeta > 0$ are given scalars, and $H_o$ is a given symmetric positive (semi) definite matrix of order $2M(N-1)$. $(\sigma^0, x^0, w^0)$ is a given triple satisfying the three conditions (a, b, c), while $\nu$ is set to 0.

In the direction generation step S42 is applied to solve the convex quadratic program $$\text{minimize } (d\varphi_\sigma^\nu)^T d\sigma + (d\varphi_x^\nu)^T dx + \frac{1}{2}\begin{pmatrix} d\sigma \\ dx \end{pmatrix}^T H_\nu \begin{pmatrix} d\sigma \\ dx \end{pmatrix}$$

subject to $\sigma^\nu + d\sigma \in \Gamma$ $G^\nu + dw - J_\sigma F^\nu d\sigma - M^\nu dx = 0$ $(x^\nu - p) \bigcirc w^\nu + \text{diag}(x^\nu) dw + \text{diag}(w^\nu) dx = \kappa_\nu g_\nu 1_{M(N-1)}$ $\|d\sigma\|_\infty \leq \zeta r_\nu$ \hfill (15)

to obtain the search triple $(d\sigma, dx, dw)$.

PIPA then applies a termination test in step S44 to determine if the computed implied volatility is within acceptable values. If $$\|(d\sigma, dx, dw)\| + r_\nu \leq \text{prescribed tolerance},$$

PIPA as shown in step S46, and the triple $(\sigma^\nu, x^\nu)$ is taken to be a desired approximate solution of (8).

If the termination condition is not met, the PIPA of the invention applies a penalty update in step S47. In this step $s_\nu \geq 1$ is taken as the smallest integer $s \geq 1$ such that $$(d\phi_\sigma^\nu)^T d\sigma + (d\phi_\sigma^\nu)^T dx - c_{\nu-1}^s[2(G^\nu)^T G^\nu + (1-\kappa_\nu)(x^\nu)^T w^\nu] < -r_\nu.$$

Set $c_\nu \equiv c_{\nu-1}^{s_\nu}$.

In step S48 PIPA determines the next step size, preferably using centrality, with $$\begin{pmatrix} \sigma^\nu(\tau) \\ x^\nu(\tau) \\ w^\nu(\tau) \end{pmatrix} \equiv \begin{pmatrix} \sigma^\nu \\ x^\nu \\ w^\nu \end{pmatrix} + \tau \begin{pmatrix} d\sigma \\ dx \\ dw \end{pmatrix}$$

determine the largest $\tau \in (0, 1]$ such that $$x^\nu(\tau) \bigcirc w^\nu(\tau) \geq \eta g_\nu(\tau) 1_{M(N-1)},$$

where $$g_\nu(\tau) = \frac{(x^\nu(\tau) - p)^T (w^\nu(\tau))}{M(N-1)}.$$

Set $$\tau_\nu^1 \equiv 0.9999 \tau.$$

In step s49, calculator 12 preferably determines step size using an Armijo line search by setting $$\tau_\nu = \tau_\nu^1 \rho^{l_\nu}$$

where $l_\nu$ is the smallest nonnegative integer l such that with $$\tau = \tau_\nu^1 \rho^l,$$

$$P_{c_\nu}(\sigma^\nu(\tau), x^\nu(\tau), w^\nu(\tau)) - P_{c_\nu}(\sigma^\nu, x^\nu, w^\nu) <$$

$$\gamma \tau [(d\varphi_\sigma^\nu)^T d\sigma + (d\varphi_x^\nu)^T dx - c_{\nu-1}^s (2(G^\nu)^T G^\nu + (1-\kappa_\nu)(x^\nu)^T w^\nu)].$$

Set $(\sigma^{\nu+1}, x^{\nu+1}, w^{\nu+1}) \equiv (\sigma^\nu(\tau_\nu), x^\nu(\tau_\nu), w^\nu(\tau_\nu))$. Choose a scalar $\kappa_{\nu+1} \in (0, \kappa_\nu]$ and a symmetric positive (semi) definite matrix $H_{\nu+1}$. Return to Step 1 with $\nu$ replaced by $\nu+1$.

It should be noted that the program or algorithm such as IMPA or PIPA, executed by calculator 12 can be written in different computer languages for different computer modules or systems. The programs can be stored on a hard drive, floppy disk, CD-ROM or other permanent or semi-permanent storage medium, as well as downloaded, for example, from a server computer, or the Internet, or transmitted as a data signal over a communications path, e.g., over the Internet or on a transmitted carrier wave, as is known in the art.

EXAMPLES

The following examples were performed through a computer program written using MATLAB® to illustrate the numerical performance of algorithms such as IMPA and PIPA, in accordance with preferred embodiments of the invention. The inverse pricing of $K \in \{2, 11, 14\}$ American put options as examples in order to determine the discretized volatilities implied by certain given option values. Thus for $k=1, \ldots, K$, the payoff function of option k is given by:

$$\Lambda^K(S, t) \equiv \max(S - E_k, 0)$$

where $E_k$ is the strike price of the option at its expiry date $T_k$. For each option k, a set of discretized American option prices $V_n^{obs,k} \equiv V_n^{obs,k}(n\delta S, 0)$, representing the set of currently observable option prices, is generated by solving the single-option LCP (4) using a constant volatility of $\sigma_0 = 0.04$ and the following parameters: $N \equiv 16$, $\delta S = 1$, $T = T_k$, $\delta t = 0.125$, $r = 0.05$, and $D_0 = 0.02$.

The constant $\sigma_0$ is not known to IMPA or PIPA; instead, we use the values $V_n^{obs,k}$ were used to define the following least-squares objective function:

$$\theta(x) \equiv \frac{1}{2} \sum_{k=1}^{K} \sum_{n \in N_k} (V^k(n\delta S, 0) - V_n^{obs,k})^2.$$

The index set $N_k$ is a singleton in all the runs; it consists of $\{n'\}$ such that $n'\delta S \equiv S_0$ the current asset price. With the objective of minimizing $\theta(x)$, the following examples show the use of IMPA or PIPA in obtaining an objective value of $\theta$ close to zero. In addition, $\Gamma$ is taken to be a rectangular box, meaning that the unknown volatility vector σ is subject to simple upper and lower bounds.

In implementing IMPA in accordance with a preferred embodiment, the major computations in each iteration were (i) the direction generation step which involves solving the convex quadratic program (13), and (ii) the evaluation of $x^v(\tau)$ for various step sizes $\tau = \rho l^v$. By using the equality constraints in (13), the variables $dx_i$ for $i \in x_v \cup \beta^v$ can be solved in terms of $d\sigma$, thereby converting (13) into a strictly convex quadratic program in the variable $d\sigma$ alone. In the experiments below, each Qv is chosen to be the identity matrix to simplify the resulting quadratic program.

The evaluation of $x^v(\tau)$ involves solving the forward option LCP (7) corresponding to $\sigma^v(\tau)$ This LCP decomposes into K independent linear complementarity subproblems each corresponding to a given option. In turn, as mentioned above, each single-option LCP can be solved backward in time. Thus, the evaluation of $x^v(\tau)$ amounts to solving KM time-stepped LCPs each of the form (4). In principle, there are many methods applicable for solving the latter LCP (4). For example, when N (the number of discretized asset prices) is large, an interior point algorithm is the preferred method for solving the LCP (4). Thus, this interior point algorithm is chosen as the principal tool for evaluating $x^v(\tau)$.

The main computation in each iteration of PIPA is the solution of the convex quadratic program (15). Unlike IMPA, there is no need to solve herein any forward option LCP. As in IMPA, the program (15) can be converted into one in the variable dσ, alone. In both cases, the highly special structure of the matrices involved is exploited to facilitate the computations.

The termination test for IMPA is $$\min(\|d\sigma\|, \theta(x^v, \sigma^v)) \leq 10^{-6} \quad (16)$$

A maximum number of 80 iterations has also been imposed. Since IMPA maintains the feasibility of the pair $(\sigma^v, x^v)$ to the MPEC (8), if IMPA terminates after 80 iterations without satisfying (16), an implied volatility vector $\sigma^v \in \Gamma$ is obtained with associated American option prices $x^v$ that are deemed satisfactory. The resulting objective values $\theta(x^v)$ at termination of IMPA in all runs were invariably very small.

The termination test for PIPA is $$\|(d\sigma, dx, dw)\| + r_v \leq 10^{-8}. \quad (17)$$

At termination, the iterate $(\sigma^v, x^v)$ produced by PIPA is an approximate feasible solution to the MPEC (8) with the feasibility accuracy being less than $10^{-8}$. The objective value $\theta(x^v)$ is reported in each run.

Example 1

Two observed put option values are given (K=2):

| k | $(E_k, T_k)$ | $V^{obs,k}$ |
|---|---|---|
| 1 | (8, 0.5) | 0.8003 |
| 2 | (8, 1.0) | 1.1217 |

The current asset price is $S_0=8$. An initial value $\sigma_{init}=0.255$ is used to start both algorithms. The discretized volatility surfaces computed by PIPA and IMPA are shown in FIGS. 5 and 6, respectively. The outputs from the two algorithms are summarized in Table 1 below. Note that the objective value obtained by PIPA is larger than that obtained by IMPA even though the residual is quite small. The two surfaces in FIG. 5 and FIG. 6 have similar shape, but are not identical.

TABLE 1

| # iter | residual | $\|d\sigma\|$ | θ |
|---|---|---|---|
| | | PIPA | |
| 31 | 3.0995e-09 | 1.2694e-11 | 1.0832e-02 |
| | | IMPA | |
| 73 | | 4.7601e-04 | 8.7225e-07 |

Since PIPA and IMPA did not produce identical surfaces and neither recovered the original constant volatility surface used to generate the observed option data, as a test to determine how close the option prices calculated from given volatility are being reproduced, the volatility surfaces obtained by PIPA and IMPA are used now as parameters in the forward problem to re-calculate the option values. For given strike prices E=8 and E=9, the three set of option values were computed and plotted using: 1) σ(S, t)=0.4, 2) σ(S, t)=$\sigma_{PIPA}$(S, t), and 3) σ(S, t)=$\sigma_{IMPA}$(S, t), shown in FIGS. 7 and 8. It is apparent that the IMPA of the invention reproduces the option prices $V_{obs}$ rather closely.

Example 2

Eleven observed put option values are given (K=11):

| k | $(E_k/T_k)$ | $V^{obs,k}$ | k | $(E_k/T_k)$ | $V^{obs,k}$ |
|---|---|---|---|---|---|
| 1 | (3, 1.0) | 0.0041 | 7 | (9, 1.0) | 1.7287 |
| 2 | (4, 1.0) | 0.0288 | 8 | (10, 1.0) | 2.4339 |
| 3 | (5, 1.0) | 0.1156 | 9 | (11, −1.0) | 3.2277 |
| 4 | (6, 1.0) | 0.3131 | 10 | (12, 1.0) | 4.0994 |
| 5 | (7, 1.0) | 0.6497 | 11 | (13, 1.0) | 5.0117 |
| 6 | (8, 1.0) | 1.1217 | | | |

The corresponding parameters are the same as those given in Example 1.

| # iter | residual | $\|d\sigma\|$ | θ |
|---|---|---|---|
| | | PIPA | |
| 73 | 7.0148e-09 | 6.8803e-15 | 2.2206e-03 |
| | | IMPA | |
| 80 | | 1.2632e-03 | 1.8398e-04 |

The discretized volatility surfaces computed by PIPA and IMPA are shown in FIGS. 9 and 10, respectively. Again, the re-calculated option values were plotted for strike prices E=8 and E=9, as shown in FIGS. 11 and 12. In this example, both. IMPA and PIPA reproduce the observed option curve very closely.

Example 3

| k | $(E_k/T_k)$ | $V^{obs,k}$ | k | $(E_k/T_k)$ | $V^{obs,k}$ |
|---|---|---|---|---|---|
| 1 | (5, 0.5) | 0.0279 | 8 | (5, 1.0) | 0.1156 |
| 2 | (6, 0.5) | 0.1240 | 9 | (6, 1.0) | 0.3131 |
| 3 | (7, 0.5) | 0.3884 | 10 | (7, 1.0) | 0.6497 |
| 4 | (8, 0.5) | 0.8003 | 11 | (8, 1.0) | 1.1217 |
| 5 | (9, 0.5) | 1.4496 | 12 | (9, 1.0) | 1.7287 |
| 6 | (10, 0.5) | 2.1913 | 13 | (10,1.0) | 2.4339 |
| 7 | (11, 0.5) | 3.0533 | 14 | (11, 1.0) | 3.2277 |

Fourteen observed put option values are given (K=14):

Following the procedure of Example 1, the following results were obtained:

| # iter | residual | $\|d\sigma\|$ | $\theta$ |
|---|---|---|---|
| | | PIPA | |
| 66 | 2.0231e-09 | 1.3517e-15 | 2.6059e-03 |
| | | IMPA | |
| 80 | | 1.7086-03 | 1.576e-04 |

The discretized volatility surfaces computed by PIPA and IMPA are shown in FIGS. 13 and 14, respectively. The re-calculated option values for strike prices E=8 and E=9 are plotted in FIGS. 15 and 16.

In all three examples, the volatility surface calculated by PIPA is lower than that calculated by IMPA. This is also reflected in the plots of the option values: the option values calculated from $\sigma_{PIPA}(S, t)$ are below those calculated from $\sigma_0=0.4$ and $\sigma_{IMPA}$.

Example 4

Again taking the option values calculated from the constant volatility ($\sigma_0=0.4$)

$$\tilde{V}_n^{obs,k} \equiv V_n^{obs,k} + 0.0707$$

to be the observed values, each observed values is perturbed by a small amount; i.e.

Thus, the new objective function is given by $$\theta(x) = \frac{1}{2}\sum_{k=1}^{K}\sum_{n \in N_k}\left(V^k(n\delta S, 0) - \tilde{V}_n^{obs,k}\right)^2$$

$$= \frac{1}{2}\sum_{k=1}^{K}\sum_{n \in N_k}\left(V^k(n\delta S, 0) - \tilde{V}_n^{obs,k} - 0.0707\right)^2$$

Clearly, $\sigma(S, t)=\sigma_0$ for all $(S, t)$ is a feasible solution to the optimization problem (9). This gives an upper bound on the optimal objective value:

$$\theta_{optimal} \leq K(0.0707)^2 = UB.$$

Examples 1–3 were repeated using this new objective function to investigate how well the IMPA and PIPA of the invention perform in relation to this upper bound value UB, starting at $\sigma_{init}=0.255$. The results are summarized below (with the "IMPA" results achieved after 80 iterations):

| | PIPA | IMPA | UB |
|---|---|---|---|
| 2 options | 2.5859e-02 | 8.8725e-07 | 1.0000e-02 |
| 11 options | 1.5442e-02 | 4.3301e-03 | 5.4983e-02 |
| 14 options | 1.0045e-02 | 6.9930e-04 | 6.9979e-02 |

While preferred embodiments of the invention have been described and illustrated, it should be apparent that many modifications to the embodiments and implementations of the invention can be made without departing from the spirit or scope of the invention. For example, while only vanilla American options are explained in the interest of simplicity, the same general approach can be applied to computing volatilities implied by exotic American options and/or American options with transaction costs, as well as the inverse pricing of other financial derivatives not described herein. The modules illustrated in FIG. 1 as making up financial engine 100 may be one or more hardware, software, or hybrid components residing in (or distributed among) one or more local or remote computer systems. Although the modules are shown as physically separated components, it should be readily apparent that the modules may be combined or further separated into a variety of different components, sharing different resources (including processing units, memory, clock devices, software routines, etc.) as required for the particular implementation of the embodiment. Indeed, even a single general purpose computer executing a computer program to produce the functionality described herein may be utilized to implement the illustrated embodiments. User interface device 18 may be any device used to input and/or output information during an exchange of information between user and financial engine 100. The interface device 18 may be implemented as a graphical user interface (GUI) containing a display or the like, or may be a link to other user input/output devices known in the art.

In addition, memory units 122, 162 described herein as used respectively in volatility calculator 12 and forward pricing unit 16 may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be memory devices embedded within CPUs 120, 162, or shared with one or more of the other components within financial engine 100. The computer programs or algorithms described herein may easily be configured as one or more hardware modules, and the hardware module shown may easily be configured as one or more software modules without departing from the invention. Although the illustrated embodiments may have described the use the class of iterative algorithms in implementing the financial engine to approach the linear complementarity issues forming part of the option pricing problem, it should be readily apparent that other known algorithms such as the class of pivotal algorithms may also be used in any implementation of the invention. Accordingly, the invention is not limited by the foregoing description or drawings, but is only limited by the scope of the appended claims.

What is claimed as new and desired to be protected by Letters Patent of the United States is:

1. A method of pricing a financial derivative whose value is based on an underlying asset, the method comprising the steps of:

retrieving input data used to generate a forward price of the financial derivative;

using a computer to calculate implied volatility of the underlying asset, wherein said calculating step is an optimization process in the form of a mathematical program with equilibrium constraints (MPEC) used to derive the implied volatility of the underlying asset;

generating a forward price of the financial derivative based on retrieved input data and the calculated implied volatility; and issuing a report to a user including the forward price generated.

2. The method of pricing a financial derivative according to claim 1, wherein said step of generating a forward price employs a discretized partial differential linear complementarity problem to generate the forward price of the financial derivative.

3. The method of pricing a financial derivative according to claim 2, wherein said step of generating further comprises, based on the implied volatilities 20 calculated in said calculation step, the substep of time stepping linear complementarity problems represented below, wherein for each m, let $V_m$, $\sigma_m$ and $\Lambda_m$ denote, respectively, the (N−1)-vectors $(V_{mn})_{n-1}^{N-1}$, $(\sigma_{mn})_{n-1}^{N-1}$ and $(\Lambda_{mn})_{n-1}^{N-1}$, $$0 \leq V_m - \Lambda_m \perp b_m(\sigma_m) + Q(\sigma_m)V_m + N(\sigma_m)V_{m+1} \geq 0$$

where $\perp$ is the notation for "perpendicular to" and for an arbitrary (N−1)-vector $\omega$, $$Q(\omega) \equiv (\delta t^{-1} + r)I_{N-1} + L_\theta(\omega), \; N(\sigma) \equiv -\delta t^{-1} I_{N-1} + L_{1-\theta}(\omega),$$

$$b_m(\omega) \equiv \frac{1}{2} \begin{pmatrix} \frac{1}{2}[\theta V_{m0} + (1-\theta)V_{(m+1)0}](r - D_0 - \omega_1)\omega_1 \\ 0 \\ \vdots \\ 0 \\ -\frac{1}{2}[\theta V_{mN} + (1-\theta)V_{(m+1)N}](r - D_0 + \omega_{N-1})\omega_{N-1} \end{pmatrix}$$

with $I_{N-1}$ being the identity matrix of order N−1 and $L_\alpha(\omega)$ being the (N−1)×(N−1) tridiagonal matrix whose entries are given by: for i, j=1, 2, ..., N−1, $$(L_\alpha(\omega))_{ij} \equiv \begin{cases} -\frac{\alpha}{2}i^2\omega_i^2 + \frac{\alpha}{2}i(r - D_0) & \text{if } j = i-1 \\ \alpha i^2 \omega_i^2 & \text{if } j = i \\ -\frac{\alpha}{2}i^2\omega_i^2 - \frac{\alpha}{2}i(r - D_0) & \text{if } j = i+1 \\ 0 & \text{otherwise.} \end{cases}$$

4. The method of pricing a financial derivative according to claim 2, wherein said step of generating is applied to multiple options using the LCP:

$$0 \leq V^k - \Lambda^k \perp b^k(\sigma) + A(\sigma)V^k \geq 0,$$

for each k=1, ..., K, a discretized option price $V^k_{mn}$ of type k is generated.

5. The method of pricing a financial derivative according to claim 1, wherein the optimization process of said step of calculating is used to minimize an objective function representing deviation of an observed price of a financial derivative from the price generated in said generating step.

6. The method of pricing a financial derivative according to claim 5, wherein the objective function in the optimization process of said step of calculating is decreased by reducing a penalty function via an Armijo inexact line search algorithm.

7. A process of implementing a forward pricing model, the process comprising the steps of:

using a computer to generate inputs to a forward pricing model from an inverse of said forward pricing model;

applying said inputs to said forward pricing model;

applying a finite difference scheme to approximate the partial differential equation of a financial derivative price model having an unknown price variable and at least one unknown input that is not said unknown price variable;

solving said approximation to obtain a solution for said unknown price of variable;

further solving said solution for said at least one unknown input to said solution to provide at least one known input; and applying said at least one known input to said financial derivative price model.

8. The process of claim 7, wherein said step of generating inputs includes the step of generating the implied volatility of the financial derivative.

9. An apparatus for pricing a financial derivative whose value is based on an underlying asset, the apparatus comprising:

a processing unit; and a memory, wherein a computer program is stored for execution by said processing unit to derive a forward price of the financial derivative based on a solution of an inverse pricing process, wherein the solution of the inverse pricing process produces implied volatilities of the underlying asset by minimizing an objective function.

10. The apparatus for pricing a financial derivative as recited in claim 9, wherein the computer program executes an iterative descent algorithm to minimize the objective function so as to produce implied volatilities of the underlying asset of the financial derivative.

11. The apparatus for pricing a financial derivative as recited in claim 10, wherein the computer program utilizes the implied volatilities in deriving prices for the financial derivatives, and allocates funds based on the prices derived.

12. The apparatus for pricing a financial derivative as recited in claim 11, wherein the financial derivative is a vanilla American option.

13. A financial instrument engine comprising:

a data source retrieving data from external sources;

a user interface device inputting data from a user;

a volatility calculator calculating volatility utilizing an optimization of a mathematical program with equilibrium constraints (MPEC); and a forward pricing unit, coupled to said data source, said user interface device, and said volatility calculator, determining forward pricing of a financial instrument based on data input to said forward pricing unit, wherein said forward pricing unit determines a projected value of the financial instrument based in part on the volatility calculated by said volatility calculator.

14. The financial instrument engine of claim 13, wherein said forward pricing unit receives as an input initial parameters, including an initial constant volatility and determines an initial theoretical forward price for use by said volatility calculator in calculating implied volatilities of an asset upon which the financial instrument is based.

15. The financial instrument engine of claim 14, further comprising a financial instrument controller issuing summary reports to the user for display through said user interface device, wherein the summary reports include the implied volatilities calculated and the value of the financial instrument projected by said forward pricing unit.

16. The financial instrument engine of claim 14, wherein said volatility calculator comprises a central processing unit (CPU) and a memory, wherein a computer algorithm is stored in the memory for execution by the CPU, the computer algorithm containing an optimization formulation that applies an iterative descent algorithm used to minimize an objective function representing deviation between observed value of the financial instrument and the value projected by said forward pricing unit.

17. An article of manufacture comprising a machine-readable storage medium having stored therein indicia of a plurality of machine-executable control program steps, the control program comprising the steps of:

(a) inputting pricing data used in the calculation of a forward price of a financial derivative, including an observed trading price;

(b) determining an initial theoretical price based on the pricing data received in said inputting step (a);

(c) calculating implied volatility data based on the pricing data input in said inputting step (a) and the initial theoretical price determined in said determining step (b), wherein said calculating step (c) comprises the substep of optimizing an objective function representing the difference between the observed trading price and the initial theoretical price;

(d) generating a final theoretical price of the financial derivative based on the implied volatility data calculated in said calculating step (c); and (e) issuing user reports containing the final theoretical price generated in said generating step (d).

18. The article of manufacture as recited in claim 17, wherein said calculating step (c) utilizes a mathematical program with equilibrium constraints (MPEC) in optimizing the difference between the observed trading price and the initial theoretical price resulting from said determining step (b).

19. The article of manufacture as recited in claim 18, wherein the objective function is based on a measure of smoothness of a surface formed by the implied volatility data produced in said calculating step (c).

20. The article of manufacture as recited in claim 18, wherein the objective function is represented by $$0 \leq x - p \perp q(\sigma) + M(\sigma)x \geq 0,$$

where $$x \equiv (V^k)_{k=1}^{K}, \; p \equiv (\Lambda^k)_{k=1}^{K},$$

are, respectively, the $KM(N-1)$-dimensional vectors of unknown option prices $$q(\sigma) \equiv (b^k(\sigma))_{k=1}^{K},$$

and known payoffs at the discretized grid points, is the $KM(N-1)$-dimensional vector that contains the given initial and boundary values of the options; and $M(\sigma)$ is the $KM(N-1) \times KM(N-1)$ block diagonal matrix all of whose K diagonal blocks are equal to the $M(N-1) \times M(N-1)$ matrix $A(\sigma)$.

* * * * *